United States Patent [19]

Wessling et al.

[11] Patent Number: 4,927,540

[45] Date of Patent: May 22, 1990

[54] IONIC COMPLEX FOR ENHANCING PERFORMANCE OF WATER TREATMENT MEMBRANES

[75] Inventors: Ritchie A. Wessling, Midland; Sharon S. Whipple, Sanford; Richard F. Fibiger, Midland, all of Mich.

[73] Assignee: The Dow Chemical Company, Midland, Mich.

[21] Appl. No.: 185,323

[22] Filed: Apr. 19, 1988

Related U.S. Application Data

[63] Continuation of Ser. No. 903,640, Sep. 4, 1986, abandoned.

[51] Int. Cl.$^5$ .................. B01D 13/00; B01D 13/01
[52] U.S. Cl. ..................... 210/638; 210/490; 210/500.27; 210/500.34; 210/500.37; 210/500.39; 210/654
[58] Field of Search ............... 210/654, 490, 500.23, 210/500.27, 500.28, 500.29, 500.35, 500.37, 500.41, 500.42, 500.43, 500.48, 500.34, 500.39, 638

[56] References Cited

U.S. PATENT DOCUMENTS

| | | | |
|---|---|---|---|
| 3,276,598 | 10/1966 | Michaels et al. | 210/500 |
| 3,283,042 | 11/1966 | Loeb | 264/49 |
| 3,335,100 | 8/1967 | Geyer | 260/2.1 |
| 3,546,142 | 12/1970 | Michaels et al. | 260/2.1 |
| 3,737,045 | 6/1973 | Hashimoto et al. | 210/490 |
| 3,877,978 | 4/1975 | Kreman | 210/653 |
| 3,886,066 | 5/1975 | Chen | 210/653 |
| 3,965,032 | 6/1976 | Gibbs et al. | 252/306 |
| 4,005,118 | 1/1977 | Heckert | 428/543 |
| 4,214,020 | 7/1980 | Ward | 210/490 |
| 4,277,344 | 7/1981 | Cadotte | 210/654 |
| 4,360,434 | 11/1982 | Kawaguchi et al. | 210/500.2 |
| 4,412,922 | 11/1983 | Mir | 210/500.35 |
| 4,432,875 | 2/1984 | Wrasidlo et al. | 210/500.2 |
| 4,539,373 | 9/1985 | Mani et al. | 525/203 |
| 4,604,204 | 8/1986 | Linder | 210/490 |
| 4,604,208 | 8/1986 | Chu et al. | 210/636 |
| 4,675,104 | 1/1987 | Rai | 210/198.2 |
| 4,704,324 | 11/1987 | Davis | 210/500.35 |
| 4,705,636 | 11/1987 | Small | 210/500.35 |
| 4,743,373 | 5/1988 | Rai | 210/198.2 |

OTHER PUBLICATIONS

Toyobo, Abstract of Japanese Kokai, No. 172,310/E5, published Sep. 5, 1985.

Primary Examiner—Ernest G. Therkorn
Attorney, Agent, or Firm—Michael L. Glenn; Thomas A. Ladd

[57] ABSTRACT

A reverse osmosis membrane bearing an ionic complex and a method of making the membrane is described. The ionic complex is formed from a first compound bearing at least one quaternary ammonium or pyridinium group and a second compound bearing at least one sulfonate or carboxylate group. The complex enhances solute rejection of the membrane.

17 Claims, No Drawings

IONIC COMPLEX FOR ENHANCING PERFORMANCE OF WATER TREATMENT MEMBRANES

CROSS REFERENCE TO RELATED APPLICATION

This is a continuation of application Ser. No. 903,640 filed Sep. 4, 1986, now abandoned.

BACKGROUND OF THE INVENTION

This invention relates to coatings for enhancing the solute rejection of reverse osmosis membranes. More particularly, this invention pertains to a complex formed from a cationic material and an anionic material which is useful for restoring or enhancing solute rejection of reverse osmosis membranes.

Semipermeable membranes are fabricated from a variety of materials and in diverse configurations. Polyamide and cellulose ester discriminating layers are widely employed in commercial reverse osmosis membranes. The membranes can be used in tubular, spiral, flat sheet or hollow fiber devices. Composite, asymmetric and homogeneous membranes are the principal forms used.

A single membrane which displays excellent chemical stability, high flux, good solute rejection and resistance to fouling has long been sought. Generally, outstanding performance in one aspect has only been achieved with compromises in other areas of performance. Moreover, both rejection and flux of a membrane tend to decline over time.

Polyelectrolyte complexes have been used in the prior art as dialysis membranes. U.S. Pat. No. 3,276,598 discloses that these films exhibit very high diffusivity to sodium chloride and other simple electrolytes, but very low diffusivity toward higher molecular weight compounds or ionic species.

A coating system which enhances or restores performance of reverse osmosis membranes has long been sought. U.S. Pat. No. 3,877,978 describes the use of certain vinyl acetate copolymers to improve rejection of membranes. U.S. Pat. No. 3,886,066 discloses the use of hydrolyzable tannins to reduce solute passage of reverse osmosis membranes. U.S. Pat. No. 4,214,020 claims a process for coating membranes assembled in devices.

SUMMARY OF THE INVENTION

The present invention is directed to a supported semipermeable membrane. The supported membrane comprises at least one semipermeable layer affixed to a supporting surface in a manner such that, when the membrane is sealingly engaged to a vessel which defines a space communicating with only one side of the membrane, components to which the membrane is permeable in a fluid mixture contacting the other side of the membrane can permeate through the membrane to the noncommunicating space. The semipermeable membrane has at least one discriminating layer which comprises an ionic complex of a first compound bearing at least one hydrolytically stable, pH independent organic cation containing nitrogen a second compound bearing at least one hydrolytically stable conjugate base of a carboxylic acid, sulfonic acid or phosphonic acid, with the proviso that at least one of the first and second compounds is a polymer or prepolymer and bears either an average of more than one cationic group or an average of more than one anionic group per compound.

The supported membrane can be used in a reverse osmosis process. In this process, solute- -containing water contacts one side of the membrane, while a lower chemical potential is maintained on the opposite side of the membrane so that water selectively permeates through the membrane. The method of this invention is particularly advantageous for enhancing the, selectivity of reverse osmosis membranes to achieve a NaCl rejection of at least 95 percent at 400 psi with 1,500 ppm NaCl feed. Alternatively, this process can be used to manufacture water-softening membranes which exhibit high rejections (at least 85 percent) of alkaline earth metal ions but only moderate (30 to 60 percent) NaCl rejection.

DETAILED DESCRIPTION OF THE INVENTION

The ionic complex which constitutes a discriminating layer of the membranes of this invention results from electrostatic attraction between the cationic groups of the first compound and the anionic groups of the second compound. The cationic groups of the first compound are preferably quaternary ammonium, pyridinium or imidazolinium groups. The anionic groups of the second compound are preferably carboxylate, sulfonate or phosphonate moieties. Optionally, in some embodiments of the invention, the first and second compounds, after deposition on the support, can be crosslinked via reaction of reactive groups these compounds bear or by use of a crosslinking agent. Illustrative of reactive groups are epoxide, vinyl,

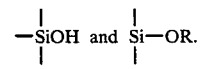

Normally, the quaternary ammonium, imidazolinium or pyridinium group does not react with carboxylate, phosphonate or sulfonate groups to form covalent bonds via nucleophilic displacement under the conditions of membrane formation and use.

Both compounds bearing quaternary ammonium, imidazolinium and/or pyridinium groups and those bearing carboxylate, phosphonate and/or sulfonate groups, which are operable in the subject process, are well known in the art. These compounds can include: (1) hydrophobic groups, (2) polymerizable moieties or (3) polymers.

The hydrophobic groups can be hydrocarbyl (i.e., a monovalent hydrocarbon) or substituted hydrocarbyl, such as perfluoroalkyl or dialkyl siloxane moieties. Exemplary hydrophobic groups are described in the surfactant literature. The hydrophobic group can bear other substituents provided these substituents do not deleteriously affect membrane characteristics. Illustrative hydrophobes include $C_8$ to $C_{20}$ mono- or divalent hydrocarbon radicals, $C_4$ to $C_{20}$ perfluorinated hydrocarbon radicals or poly(dimethyl siloxane) moieties.

Prepolymer compounds are compounds bearing at least one group capable of reactions in situ to form polymers which are not deleterious to desired membrane characteristics. Illustrative reactive moieties are ethylenically unsaturated groups, a vicinal epoxide, alkoxysilane or silanol.

Polymeric compounds are advantageously condensation or addition polymers. Preferably, these polymers bear an average of more than one carboxylate or quaternary ammonium group. The desired groups can be part of the polymer chain, pendant from but bonded to the chain, bonded to the ends of the polymer chain or part of a pendant moiety bonded to the chain. Operable polymers include water-soluble polyelectrolytes, water-dispersible polyelectrolytes, polysoaps, polymeric surfactants, ionene polymers, or a latex; said polymer bearing either: (1) a quaternary ammonium, imidazolinium or pyridinium or (2) a carboxylate, phosphonate or sulfonate group. Also operable is a water-insoluble polymer bearing a plurality of the aforementioned ionic groups of like charge, which is suitable as a membrane support. Preferred polymers include vinyl addition polymers, polyalkylene oxides, polyalkylene sulfides, aromatic polyamides, aromatic polysulfones, polyphenylene oxides, polyphenylene sulfides, phenoxy resins and cellulosic polymers. The molecular weight and other characteristics of the polymer are desirably such that the polymer deposited on the support does not readily redisperse in an aqueous coating solution, but readily forms a thin film on the support.

The term "hydrolytically stable" denotes that a group is stable for a period of hours in water at the operation pH and other conditions at which the membrane is used. Preferably, the first and second compounds are hydrolytically stable. In general, hydrocarbons, optionally including ether, amine, sulfide and sulfone groups, are the most hydrolytically stable. Moderately stable hydrocarbons include those with amide, sulfonamide and hindered aliphatic ester groups.

A quaternary ammonium group is a tetravalent nitrogen bearing four substituents and having a positive charge. The substituents can each independently be monovalent hydrocarbon radicals, monovalent inertly-substituted hydrocarbon radicals or monovalent hydrocarbon radicals bearing other quaternary ammonium groups. All four valences of the cationic nitrogen are bonds to carbon atoms. Inertly-substituted hydrocarbons denotes that the hydrocarbon does not bear substituents deleterious to membrane formation or characteristics. The quaternary ammonium compound can be alicyclic or include a five- or six-member heterocyclic ring, optionally including —O—, —S—, —NH—,

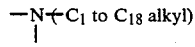

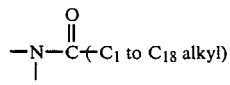

in the ring. Preferably, at least one substituent on the quaternary ammonium compound is a hydrophobic group, a polymerizable group or a polymer. More preferably, at least one of the substituents is a polymer and the other substituents are $C_1$ to $C_{18}$ alkyl, benzyl, phenyl, alkoxysilane derviatives or $C_1$ to $C_8$ perfluoroalkyl.

Pyridinium compounds are also well known in the art. For the purposes of this invention, pyridinium denotes heterocyclic aromatic compounds which include a six-member ring with five carbon atoms and one nitrogen bearing a positive charge. Optionally, the aromatic ring can bear inert substituents or be part of a fused ring system. Preferably, the pyridinium is bonded to a polymer. Preferred pyridinium compounds include vinyl addition polymers derived from vinyl pyridine.

Imidazolinium compounds are also known in the art. These compounds are five-member rings consisting of three carbon atoms and two nitrogen atoms in the ring. The two nitrogens form a conjugated system together with the carbon bonded to both nitrogens and the positive charge is generally viewed as being delocalized between the nitrogens.

In one preferred embodiment of the invention, the first compound is a siloxane derived from alkoxysilane represented by formula I

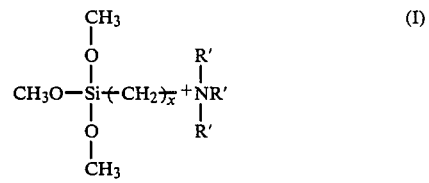

wherein x is an integer from 1 to 18 and R' is independently at each occurrence a $C_1$ to $C_{22}$ alkyl or alkenyl, $C_1$ to $C_4$ hydroxyalkyl, phenyl or benzyl. Preferably, at least one R' is a $C_6$ to $C_{22}$ alkyl. Alternatively,

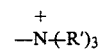

can be pyridinium, imidazolinium, or

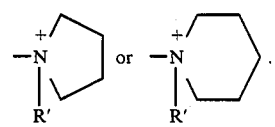

Preferably, at least one, but not more than two, of the R' groups is a $C_{10}$ to $C_{18}$ alkyl or alkenyl. More preferably, x is 2 to 5. The alkoxysilane is readily polymerized to a siloxane via known hydrolysis reactions.

In a preferred embodiment of the invention, the quaternary ammonium, imidazolinium or pyridinium compound is a vinyl addition polymer. Such compounds can be prepared by techniques known in the art. For example, vinyl benzyl chloride can be polymerized with compatible ethylenically unsaturated monomers and the resulting polymer reacted with pyridine or a tertiary amine to provide a quaternary ammonium or pyridinium polymer. Desirably, the monomer bearing the quaternary ammonium or pyridinium group constitutes from about 10 to about 50 mole percent of the first compound. Illustrative of other monomers which may be present are vinyl acetate, styrene, hydroxyethyl methacrylate, $C_1$ to $C_4$ alkyl methacrylate or a compound of formula II

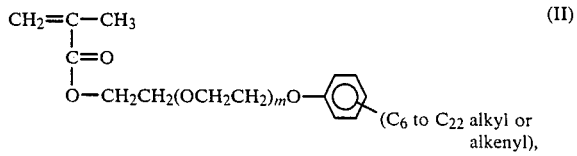

wherein m is an integer from 1 to 20. The comonomers can bear inert substituents, i.e., substituents which do not affect the membrane adversely.

The nitrogen cation of the first compound can operably be a pendant group or part of a polymer backbone or hydrophobe chain. Generally, it is preferred that the nitrogen cation is present in a pendant group, more preferably at least 2 carbon atoms removed from the polymer backbone or other shielding groups.

The counterion present with the quaternary ammonium, imidazolinium or pyridinium can be any anion which does not deleteriously affect membrane formation or performance. Compatible counterions include bromide, chloride, hydroxide, bicarbonate and acetate.

Carboxylate, phosphonate and sulfonate compounds operable in the subject invention are also well known Preferably, the second compound is a polymer bearing a plurality of one or more of these anionic moieties. Vinyl addition copolymers derived from ethylenically unsaturated carboxylic or sulfonic acids are preferred. Illustrative carboxylic and sulfonic acid monomers include acrylic acid, methacrylic acid, maleic acid, crotonic acid and vinylbenzyl sulfonic acid. Generally, these monomers would be polymerized in their acid form and then reacted with a base to create a plurality of carboxylate or sulfonate groups. In one preferred embodiment, the second compound is a vinyl polymer derived from about 1 to about 50 weight percent methacrylic acid or crotonic acid. Preferred as a comonomer are vinyl acetate, $C_1$ to $C_4$ alkyl methacrylate, hydroxyethyl methacrylate and the compound corresponding to formula II. In another preferred embodiment, a copolymer of styrene maleic anhydride, advantageously in a 1:1 ratio of monomers, is treated with ammonia to produce styrene/maleamic acid. Illustrative of other operable comonomers are styrene, inertly substituted styrene, vinyl chloride, alkyl acrylates, vinyl pyrrolidone, vinyl alkyl ether, hydroxyalkyl acrylate and the like.

In one preferred embodiment of the invention, one of the first and second compounds is a water-compatible polymer and the other is a polymerizable surfactant. The polymerizable surfactant can bear either cationic or anionic groups, provided the water-compatible polymer bears groups of the opposite charge. For example, the water-compatible polymer can operably be a vinyl polymer derived from about 1 to about 50 weight percent methacrylic acid or crotonic acid as noted hereinbefore. Illustrative of specific compounds which can be modified to prepare either polymerizable surfactants or water-compatible polymers bearing cationic groups are vinyl polymers derived from vinylbenzyl trialkyl quaternary ammonium or quaternary ammonium functionalized glycidyl methacrylate and a quaternary ammonium bearing a hydrocarbon moiety functionalized with epoxide groups. Such compounds can be prepared by techniques known in the prior art. The polymerizable surfactant also can be an alkoxysilane of formula I or a derivative thereof which can be polymerized in situ and is effective as a surface-active agent in water. Preferably, the quaternary ammonium of the first compound bears one or two $C_{10}$ to $C_{18}$ alkyl or alkenyl groups. The advantage of using a polymerizable surfactant is that it is water-compatible, forms coacervates readily and can be polymerized during or after the coacervation. Once polymerized, the surfactant becomes water-insoluble.

The counterion present with the carboxylate, phosphonate or sulfonate can be any cation which does not deleteriously affect membrane characteristics or formation of a discriminating layer. Preferred compatible cations include alkali metal cations and ammonium.

The discriminating layer or layers of the supported semipermeable membrane are, advantageously, relatively thin. Typically, the cumulative thickness of the discriminating layer is in the range from about 0.01 to about 10 microns. Preferably, the discriminating layer of the membrane is in the range from about 0.05 to about 5 microns thick.

In part because of the desired thinness of the discriminating layer, it is necessary to provide structural support for the membrane when it is employed in a separation apparatus. Typically, this support is provided via a substrate layer on which the ionic complex is formed.

In general, the peripheral area of the membrane will be affixed to or otherwise engage a support, frame or tubesheet structure attached to the outer edge of the membrane. The membrane can engage the supporting structure by a clamping mechanism, adhesive, chemical bonding or other techniques known in the prior art. The membrane can then be sealingly engaged in the conventional manner in a vessel so that the membrane surface separates two otherwise non-communicating compartments in the vessel. The skilled artisan will recognize that the structure which engages the membrane can be an integral part of the vessel or even the outer edge of the membrane.

The membrane can be present in any conventional configuration. Tubular, spiral, flat sheet and hollow fiber membranes are contemplated. The structure and fabrication of membrane devices from membranes of these various types is well known in the art.

In one embodiment of the invention, the membrane is supported on a porous substrate or structure. This porous supporting layer is characterized in that it does not significantly impede the transport across this layer of all components of a fluid in contact with the porous layer. The porous supporting layer is a polymer membrane with high porosity and relatively small pores. Illustrative of such polymeric supporting layers are microporous cellulose ester and microporous polysulfone membranes useful for ultrafiltration. Advantageously, the largest pore dimension is less than about 1 micron, more preferably less than about 0.1 micron. Such membranes are commercially available under the tradenames MILLIPORE, PELLICON and DIAFLO. Where such supporting membranes are thin or highly deformable, a frame may also be necessary to adequately support the semipermeable membrane. In one especially preferred embodiment, the polymeric supporting layer is a hollow fiber of a microporous polymer such as polysulfone, polyethersulfone, polycarbonate, polybenzimidazole, cellulose acetate or other cellulose esters. The hollow fiber itself provides adequate support for the semipermeable membrane layer coated on the inside or outside surface of the fiber. Polysulfone hollow fibers are the preferred porous support for the membranes described herein.

In a preferred embodiment of the invention, the supporting layer is itself a semipermeable membrane. This support can be a composite, asymmetric or homogeneous membrane known in the art. For example, cellulose ether and ester derivatives can be used as membranes as disclosed in Loeb et al., U.S. Pat. No. 3,283,042, which is incorporated herein by reference. Especially preferred support layers are asymmetric cellulose diacetate or triacetate reverse osmosis membranes. Also preferred are composite polyamide membranes, such as those claimed and described in U.S. Pat. No. 4,277,344, which is incorporated herein by reference. U.S. Pat. No. 3,886,066 describes a number of semipermeable membranes which are operable as supports for the ionic complex described herein and are incorporated herein by reference. The ionic complex can enhance solute rejection of a freshly made reverse osmosis membrane or restore rejection which has declined during operation of such a membrane.

In general, the supporting layer is treated sequentially with coatings of the first and second compounds in a solution or colloidal dispersion. The diluent for the coating formulation is advantageously aqueous, but other diluents are operable. Illustrative diluents include $C_1$ to $C_4$ alkanols, $C_2$ to $C_3$ alkylene glycols, and water-soluble co-solvents, such as dioxane, dimethyl formamide, tetrahydrofuran and dimethyl sulfoxide. In addition to a diluent and the first or second ionic compound, the coating formulation can contain surfactants, solutes, plasticizers, or other modifiers.

The designation of the cationic component as a first compound and the anionic component as a second compound was coined for convenience in referring to these materials and does not connote any specific order of application to the support. Best antifoulant behavior generally observed where the ionic complex comprises a balance of charges or retains some anionic character One important property of the coating formulation is the ability to form thin, continuous films of generally uniform thickness without defects or holes. To form such films, the coating formulation must spread readily across the surface of the substrate. For the desired spreading to occur, the spreading coefficient, i.e., the difference between the work of adhesion and the work of cohesion of the liquid must be positive. For many water-soluble materials, surface tension increases as the solvent evaporates. Consequently, the coating formulation frequently has a tendency to draw together as it dries. The presence of small amounts of compatible organic or fluorochemical surfactants, preferably 0.05 to 0.3 percent on a solids basis by weight, alleviates this problem. Advantageously, the surfactants should be nonionic or should bear like charges as other components of the formulation. Alternatively, the cationic or anionic compounds can include moieties which impart surface activity to the coating formulation. For example, the inclusion in a polymer of hydrophobic groups may decrease surface tension and increase viscosity of the formulation as it dries. Illustrative of such moieties is

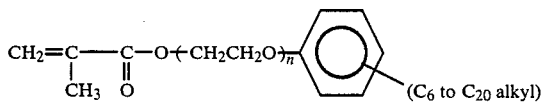

wherein n is an integer from 1 to 50. U.S. Pat. No. 3,965,032, in the context of linear interpolymeric interfacially spreading polyelectrolytes, describes combinations of monomers which promote film formation. These teachings are incorporated herein by reference.

In one preferred embodiment of the invention, the coating formulations are applied to membranes assembled in a device or in subassemblies of such a device. The concentration of the component of the ionic complex is desirably less than about 1,000 parts per million (ppm) by weight more preferably less than about 100 ppm by weight when the membrane is coated in a device. Where the membrane is coated external to a device the concentration of the quaternary ammonium and/or pyridinium or the carboxylate and/or sulfonate can vary over a wide range. Typically, the coating formulation will contain from about 0.1 ppm by weight of the ionic component up to a concentration at which precipitates or agglomerates are formed. A concentration of solids from about 0.001 to about 5 weight percent is preferred.

Conveniently, the coating formulations are applied to the substrate by conventional techniques, such as dipping, casting, spraying, wiping, rolling or filtration of the coating solution through the substrate. The excess coating is desirably removed by draining or drawing a smooth instrument, e.g., a blade or roller, across the substrate surface. Multiple coats can also be applied to eliminate defects. The temperature and pH of the coating solution are selected so as to maintain the desired ionic moiety's concentration in the coating formulation and afford the desired film-forming properties. These operating parameters are generally not critical so long as the resulting membrane is not deleteriously affected. Ambient temperatures during coating, i.e., about 20° to 35° C., are generally convenient, although other temperatures are operable. A pH in the range from about 7.0 to about 7.8 is preferred for vinyl acetate/crotonic acid copolymers. A pH of from about 6.0 to about 7.5 is preferred for polymeric siloxanes bearing quaternary ammonium groups.

Preferably, the membrane treating compounds in the formulation first deposited should have a high affinity for the surface to be coated, such that they persist on the surface until fixed by formation of a coacervate with compounds of the opposite charge or by formation of covalent bonds. However, compounds with low affinity for the treated surface can be used provided the chemical potential gradient is maintained until a second reactant in a two-step process has been introduced to form the coacervate. Imposition of a pressure differential across the membrane is a preferred technique. Other operable methods of producing the desired chemical potential gradient can be employed. Differences in temperature, concentration or electrical potential are also operable.

In sequential coating of reactive compounds, the coating of one reactant whether cationic or anionic, is typically applied to form an adherent, uniform, comparatively thin layer on the substrate. A coating of the reactant of opposite charge is then applied, advantageously washed with additional diluent and the diluent removed or the coating otherwise treated to promote reaction. Advantageously, if a coacervate is to be formed, it should occur before washing the coating or removal of diluent from the second coating. This procedure can be repeated as desired in multiple coatings. Advantageously, the ionic reactant in the first coat is a high molecular weight film-forming polymer, preferably bearing hydrophobic substituents to enhance its film-forming properties without rendering the reactant water-incompatible.

In another embodiment of the invention, separate formulations of the cationic and anionic compounds are applied to opposite sides of a support that is permeable to at least one of the compounds. Preferably, a coacervate layer is formed at the interface where the reactants make contact. The excess formulations are then removed to leave the thin coacervate.

The preferred reactants used in the formation of the coacervate coatings are separately water-compatible, but together form water-insoluble, ionically-bonded adducts. In order for a coacervate to form, the first and second compounds must bear ionic groups with opposite charges at the pH at which the groups are in contact.

The water compatible ionic compounds preferred as reactants include water-soluble, hydrolytically stable monomers bearing from 2 to 10, more preferably 2 to 4, cationic or anionic groups per molecule. Preferably, the compounds bear exclusively anionic or exclusively cationic groups. The reactants desirably have molecular weights in the range from 100 to 1,000 as determined by gel permeation chromatography), more preferably 200 to 600.

In another preferred embodiment of the subject invention, the substrate or support itself bears complex-forming cationic or anionic groups on at least one surface. Such substrates can be prepared by resort to a variety of techniques known in the art. Reactive monomers, such as acrylic acid, vinylbenzyl chloride or vinylpyridine can be grafted on to the substrate and the desired anion, i.e., carboxylate, sulfonate, or phosphonate, or selected cation, i.e., pyridinium, imidazolinium or quaternary ammonium, derived therefrom. The substrate can be made from a polymer or a polymer blend bearing ionic groups. The asymmetric microporous support can be prepared in accordance with U.S. Pat. No. 3,615,024 or by other conventional processes. Conveniently, a water-insoluble polymer is dissolved in a combination of a water-immiscible solvent that is a solvent for the polymer and a water-miscible additive which is a non-solvent for the polymer. The additive typically is compatible with the polymer in the mixture with the water-immiscible solvent, but is incompatible in the presence of water.

To illustrate the invention, a water-permeable weight of at least 300 is sequentially coated with a layer of an ionic polymer of a first charge and a water-compatible polymer or monomer of opposite charge. The membrane is optionally treated in an assembled membrane device or a subassembly of a plurality of membranes which can be readily fabricated in a membrane device. In a preferred method, the feed side of the membrane is contacted with a dilute (preferably about 0.01 to about 50 parts per million (ppm) by weight) aqueous solution of a first polymeric ionic reactant while maintaining a chemical potential across the membrane, so as to transport water through the membrane. Generally, dilute solutions of 0.1 to 5 ppm by weight are preferred. Higher concentrations are operable, as long as the viscosity is not so nigh as to adversely affect the membrane formation. Preferably, the chemical potential gradient is achieved by a pressure differential across the membrane, operably 0.1 to 1,500 psi, preferably about 100 to about 800 psi.

Advantageously, the coating solution includes 50 to 5,000 ppm of NaCl or other inorganic solute, with zero to 20,000 ppm solute being operable with the proviso that the coating polymer must be compatible with the resulting solution. Preferably, contact with the first solution is maintained until either the flux through the membrane or salt rejection declines to a new steady state value. Desirably, the coating solution is circulated over the membrane surface to be treated. The feed side of the membrane is then washed with water to remove any excess of the ionic polymer. A dilute aqueous formulation of a second ionic polymer or monomer opposite in charge to the first is brought into contact with the feed side of the membrane with a chemical potential applied to cause permeation of water. Once again, the chemical potential is desirably maintained until a steady state of flux or salt rejection is approached. The excess of the second ionic polymer or monomer is then removed with a water wash.

The ionic complex can be used to form or enhance performance of reverse osmosis membranes of the nanofiltration, low pressure brackish water, standard pressure brackish water or seawater type. Nonofiltration membranes generally have a nominal rejection of at least about 85 percent of a 2,000 ppm $MgSO_4$ solute at 50 psi. The brackish water membranes have a rejection of at least about 90, preferably at least about 95 percent of a 1,500 ppm NaCl solution at 250 psi for low pressure membranes and 400 psi or standard pressure membranes. The seawater membranes have a nominal rejection of at least about 95, preferably at least about 98, percent of a 35,000 ppm NaCl solution at 800 psi.

The selection of the first and second ionic reactants and the conditions for coating will determine the characteristics of the ultimate product. The rate of formation of the coacervate may affect the membrane characteristics. Additionally, the chemical stability imparted to the membrane will be influenced by the nature of the first and second compounds. Consequently, the ionic coating layer in some embodiments can improve the chlorine tolerance of reverse osmosis membranes.

The molecular weight, charge density, hydrophilicity and other properties of the ionic polymers can be varied by known techniques. The optimum reactants, membrane formation processes and separations can then be determined empirically.

The ionic complex described herein is not strongly bonded unless crosslinked. In many cases, the ionic complex will be removed during conventional processes for chemically cleaning fouled membranes. The destruction of the ionic complex may be advantageous in that it can enhance cleanability of the membrane. Generally, after cleaning the membrane, it is desirable to form a new ionic complex.

In one embodiment of the invention, the ionic complex can be continuously reformed by introducing in low concentration one ionic compound which is dispersible into the feed to the reverse osmosis membrane. This can be conveniently achieved by treating a filter used for silt removal from the feed after with the ionic compound. Desirably, the filter bears a charge opposite that of the ionic compound. The ionic compound can then leach into the feed water from the treated filter and contact the membrane surface bearing an opposite charge.

The following examples are presented to illustrate the invention. All parts and percentages are by weight unless otherwise indicated.

EXAMPLE 1

An asymmetric cellulose triacetate reverse osmosis membrane device was tested using a 1,500 ppm sodium chloride aqueous feed at a pressure of 400 pounds per square inch gauge (psi). The salt rejection was determined to be 91.5 percent with a productivity of 26,165 gallons per day (GPD).

The tested membrane was treated with 50 gallons of water containing 60 g of a copolymer of 95 mole percent vinyl acetate and 5 mole percent crotonic acid. The water was fed to the membrane at 250 psi at 24° C. and a pH of 7.0 with a recovery of 70 percent. After 70 minutes the tank and lines were rinsed and the membrane was stored for 15 hours at a pH of 5.8. The membrane now had a salt rejection of 96.6 percent and a productivity of 23,486 GPD.

A 50:50 mixture of 3-1 trimethoxysilyl) propyloctadecyldimethyl ammonium chloride in deionized water was prepared and stirred at 25° C. for 2.7 hours to form a polymer. An aqueous mixture containing 100 g of the siloxane polymer was added in 25 g increments to 50 gallons of water fed to the previously treated membrane. The membrane was operated at 250 psi at a temperature of 30° C. and a pH of 7.1 with a recovery of 72 percent. After 2 hours the membrane operation was ceased and the permeator rinsed with water at a pH of 8.0 for 2 minutes. The membrane was allowed to sit overnight and then was tested. The salt rejection was determined to be 98.2 percent with a productivity of 22,982 GPD.

EXAMPLE 2

An asymmetric cellulose triacetate reverse osmosis device was tested using standard conditions of 1,500 ppm sodium chloride aqueous feed, a pressure of 250 pounds per square inch gauge (psig), a temperature of 25° C., and a recovery of 75 percent. The salt rejection was determined to be 90.4 percent with a productivity of 26,670 gal/day.

To 100 g of water was added a solution containing 49 g methanol and 42 g 3-(trimethoxysilyl) propyloctadecyldimethyl ammonium chloride (TMS). It was then mixed thoroughly and allowed to stand for 70 minutes, at which time the solution begin to appear cloudy. The solution was then added slowly in 100 g increments to the 100 gallons of water which had been previously adjusted to pH 7.0-7.5. The membrane was treated with the solution at a temperature of 30° C., a feed pressure of 250 psi and recovery of 75 percent. The pH was adjusted to 7.0-7.5 after final polymer addition and recirculation continued for 2 hours. The system was shut down and rinsed out except for the permeator.

Forty gallons of deionized (DI) water was adjusted to pH 8 and then recirculated through the permeator for 2 minutes at 50 psig. The system was shut down for four days and then tested under standard conditions.

The membrane was then treated with a second coating from a 50-gallon solution of DI water containing 0.75 grams of VINAC (a copolymer of 95 mole percent vinyl acetate and 5 mole percent crotonic acid commercially available from Air Products and Chemical, Inc.). The VINAC water was recirculated through the permeator at 250 psi, 25° C., 75 percent recovery, and pH 7.2. The permeator was then rinsed by allowing the brine to go to drain and making up with DI water. The pH was then reduced to 4 with HCl and recirculation continued for one hour before shutting down. The VINAC coating was then repeated with an additional 0.75 gram. Membrane performance was determined at standard conditions.

TABLE I

| Treatment | Productivity (GPD) | Salt Rejection (percent) |
| --- | --- | --- |
| None | 26,670 | 90.4 |
| After TMS | 26,190 | 93.3 |
| After TMS/VINAC | 22,170 | 95.5 |

Performance for the device before and after the treatment steps is tabulated in Table I. The treatment with the siloxane significantly improved rejection of the membrane without significant reduction of productivity.

EXAMPLES 3-14

In a manner generally similar to Example 1, a cellulose triacetate hollow fiber reverse osmosis membrane loop cell was first treated with an aqueous solution of 25 parts per million (ppm) of an anionic polymer followed by an aqueous solution of 25 ppm of a polymer prepared from 3-(trimethoxysilyl) propyloctadecyldimethyl ammonium chloride. Both treatments were applied at 250 or 300 psi at a pH in the range of 7.0 to 7.5. In some instances, sodium chloride was present in treatment solutions.

The anionic polymers were selected from the following: (A) a 90:10 copolymer of hydroxyethyl methacrylate/methacrylic acid salt (HEMA/MAA); (B) a 60:40 copolymer of HEMA/MAA; (c) a 90:10 copolymer of sulfoethyl methacrylate/methacrylic acid salt (SEMA/MAA) and (D) a 95:5 mole percent copolymer of vinyl acetate and crotonic acid (VA/CA).

The salt rejection in percent and flux in gallons per square foot per day (GFD) were measured prior to treatment and post treatment at the same pressure as the treatment with 1,500 or 2,000 ppm of NaCl in the feed at about 23° C. The post treatment performance reported was observed after 12 to 16 hours of operation. The membrane performance is tabulated in Table II.

TABLE II

| | | Initial | | Post Treatment | |
| --- | --- | --- | --- | --- | --- |
| Example | Anionic Coating | Salt Rejection (%) | Flux (GFD) | Salt Rejection (%) | Flux (GFD) |
| 3 | A | 88.4 | 11.5 | 92.4 | 12.9 |
| 4 | A | 87.1 | 10.9 | 91.3 | 11.6 |
| 5 | B | 89.8 | 14.3 | 92.8 | 12.1 |
| 6 | B | 91.5 | 12.7 | 94.1 | 11.5 |
| 7 | C | 88.0 | 12.3 | 88.9 | 9.9 |
| 8 | C | 91.9 | 14.4 | 92.7 | 11.7 |
| 9* | D | 89.5 | 16.3 | 98.4 | 8.6 |
| 10* | D | 87.4 | 12.9 | 98.1 | 7.1 |
| 11** | D | 94.9 | 11.8 | 99.1 | 7.8 |
| 12** | D | 95.7 | 11.4 | 98.9 | 8.1 |
| 13 | D | 96.6 | 11.5 | 98.8 | 4.6 |
| 14 | D | 96.6 | 12.1 | 99.4 | 4.6 |

*1,500 ppm NaCl in treatment solution.
**350 ppm NaCl in treatment solution.

The data tabulated in Table II indicate the treatments increase salt rejection of the cellulose triacetate membranes.

EXAMPLES 15-20

In a manner otherwise generally similar to Examples 3-8, thin film composite membranes bearing a polyamide discriminating layer prepared from meta-phenylene diamine and trimesoyl chloride was treated. The anionic polymers in the treatment were selected from A, B and C and the cationic polymer was the same as in Examples 3-8. The salt rejection and flux of the membranes before and after treatment is tabulated in Table III.

TABLE III

| Example | Anionic Coating | Initial | | Post Treatment | |
|---|---|---|---|---|---|
| | | Salt Rejection (%) | Flux (GFD) | Salt Rejection (%) | Flux (GFD) |
| 15 | A | 95.2 | 35.2 | 98.8 | 6.8 |
| 16 | A | 95.3 | 39.2 | 99.2 | 6.0 |
| 17 | B | 96.3 | 55.2 | 98.6 | 12.7 |
| 18 | B | 94.9 | 56.7 | 98.8 | 13.2 |
| 19 | C | 95.6 | 52.5 | 98.2 | 12.6 |
| 20 | C | 96.7 | 49.8 | 98.5 | 11.7 |

The data tabulated in Table III indicate the treatments increase the salt rejection of polyamide membranes.

EXAMPLES 21-28

In a manner generally similar to Example 13, a cellulose triacetate hollow fiber membrane device was treated with a vinyl acetate/crotonic acid copolymer at a concentration of 5 or 25 ppm in water at a pressure of 300. Each device was then treated with an aqueous ppm solution of one of the following anionic materials:

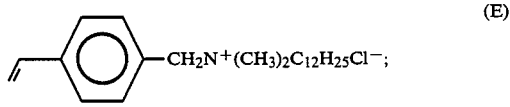
(E)

(F) a fluorinated surfactant sold by Minnesota Mining and Manufacturing Company as FC-135 surfactant; (G) cetyl pyridinium chloride and

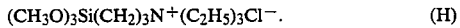
(H)

The salt rejection and flux of each device was then measured in accordance with the procedure in Example 8. The membrane performance is tabulated in Table IV.

TABLE IV

| Example | Anionic Coating | Initial | | Post Treatment | |
|---|---|---|---|---|---|
| | | Salt Rejection (%) | Flux (GFD) | Salt Rejection (%) | Flux (GFD) |
| 21* | E | 96.8 | 13.0 | 99.0 | 8.1 |
| 22* | E | 96.7 | 13.5 | 98.8 | 6.0 |
| 23* | F | 88.6 | 15.8 | 95.9 | 10.1 |
| 24* | F | 89.1 | 16.4 | 96.1 | 11.1 |
| 25** | G | 88.3 | 11.0 | 94.4 | 13.1 |
| 26** | G | 90.1 | 11.5 | 93.8 | 12.1 |
| 27** | H | 89.5 | 11.8 | 96.3 | 9.5 |
| 28** | H | 90.3 | 9.4 | 96.4 | 7.5 |

*25 ppm vinyl acetate/crotonic acid copolymer.
**5 ppm vinyl acetate/crotonic acid copolymer.

Examples 21-28 demonstrate that a number of anionic compounds can be used with a cationic polymer to enhance the salt rejection of cellulose triacetate reverse osmosis membranes.

EXAMPLES 29-30

In the general manner of Example 13, a cellulose triacetate membrane is treated sequentially under pressure with aqueous solutions of 10 ppm 95:5 vinyl acetate/crotonic acid copolymer followed by 25 ppm of a polymer derived from TMS and a second treatment with 10 ppm 95:5 vinyl acetate/crotonic acid copolymer. The salt rejection and flux before and after treatment were measured at standard conditions and are tabulated in Table V.

TABLE V

| Example | Initial | | Post Treatment | |
|---|---|---|---|---|
| | Salt Rejection (%) | Flux (GFD) | Salt Rejection (%) | Flux (GFD) |
| 29 | 91.3 | 14.7 | 97.9 | 7.6 |
| 30 | 92.6 | 14.3 | 98.3 | 7.4 |

The three-step treatment enhances the salt rejection and provides a desirable anionic surface on the membrane.

EXAMPLES 31-32

A cellulose triacetate hollow fiber membrane device was treated sequentially at pressures of 300 psi with aqueous solutions of (a) 25 ppm of a 1:1 styrene/maleamic acid copolymer bearing carboxylate groups and (b) 25 ppm of a cationic surfactant sold by Sherex Chemical Company under the tradename ARQUAD 2C-15 surfactant, which bears pendant ammonium groups bearing a dodecyl group. The rejection and flux through the membrane was determined before and 12 hours after treatment and are tabulated in Table VI.

TABLE VI

| Example | Initial | | Post Treatment | |
|---|---|---|---|---|
| | Salt Rejection (%) | Flux (GFD) | Salt Rejection (%) | Flux (GFD) |
| 31 | 83.7 | 11.0 | 90.1 | 10.2 |
| 32 | 90.9 | 10.7 | 94.0 | 8.9 |

EXAMPLE 33

A microporous mixed cellulose ester filter (Millipore VSWP 0.025 μ filter) was coated sequentially in the general manner of Example 29. When tested the membrane exhibited a salt rejection of 68.2 percent and a flux of 0.4 GFD.

What is claimed is:

1. An improved reverse osmosis membrane comprising a semipermeable reverse osmosis membrane having a first discriminating layer as a supporting surface and affixed to the supporting surface is a second thin film layer comprising an ionic complex of a first compound bearing at least one quaternary ammonium, imidazolinium or pyridinium group and a second compound bearing at least one carboxylate, phosphonate or sulfonate group, with the proviso that at least one of the first and second compounds is a polymer or prepolymer and also bears an average of more than one ionic group per molecule.

2. The membrane as described in claim 1 wherein the supporting surface is a hollow fiber reverse osmosis membrane.

3. The membrane as described in claim 1 wherein the supporting surface is a hollow fiber membrane of cellulose acetate, cellulose diacetate or cellulose triacetate.

4. The membrane as described in claim 1 wherein the membrane bearing the ionic complex has a sodium chloride rejection of at least about 90 percent using an aqueous feed with 1,500 ppm sodium chloride at a pressure of 250 psi.

5. The membrane as described in claim 1 wherein the first compound is a polymerizable surfactant and the second compound is a water-compatible polymer of opposite charge to the surfactant.

6. The membrane as described in claim 5 wherein the second compound is a vinyl addition polymer derived from about 1 to about 50 weight percent methacrylic acid or crotonic acid and a remaining amount of at least one monomer selected from vinyl acetate, $C_1$ to $C_4$ alkyl methacrylate, hydroxyethyl methacrylate and

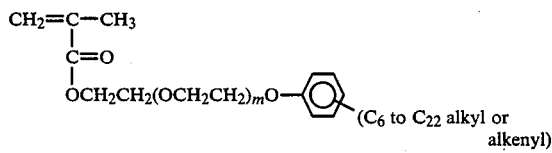
($C_6$ to $C_{22}$ alkyl or alkenyl)

wherein m is an integer from 1 to 20.

7. The membrane as described in claim 6 wherein the first compound is a siloxane derived from an alkoxysilane of the formula

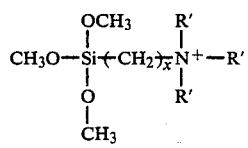

wherein x is an integer from 1 to 18 and R' is independently at each occurrence a $C_1$ to $C_{22}$ alkyl or alkenyl, $C_1$ to $C_4$ hydroxyalkyl, phenyl, or benzyl, with the proviso that at least one R' is a $C_6$ to $C_{22}$ alkyl or alkenyl.

8. The membrane as described in claim 7 wherein x is an integer from 2 to 5 and at least one, but not more than two, of the R' moieties are $C_{10}$ to $C_{18}$ alkyl or alkenyl.

9. The membrane as described in claim 7 wherein the second compound is a vinyl polymer containing from about 1 to about 50 weight percent methacrylic acid or crotonic acid and a remaining amount of vinyl cetate, $C_1$ to $C_4$ alkyl methacrylate, hydroxyethyl methacrylate or

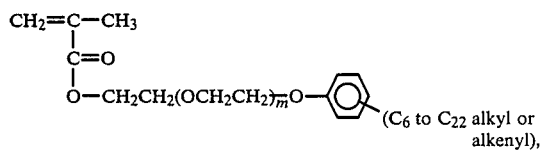
($C_6$ to $C_{22}$ alkyl or alkenyl), wherein m is an integer from 1 to 20.

10. The membrane as described in claim 9 wherein the second compound is applied first to a reverse osmosis membrane followed by the first compound.

11. The membrane as described in claim 10 further comprising a second layer of the first compound on the second compound.

12. The membrane as described in claim 6 wherein the first compound is a vinyl addition polymer of vinylbenzyl chloride and a compatible comonomer which has been reacted with pyridine or a tertiary amine so that the polymer bears a plurality of cationic nitrogen groups.

13. The membrane as described in claim 5 wherein the polymerizable surfactant bears at least one quaternary ammonium group.

14. The membrane as described in claim 1 wherein the ionic complex imparts greater tolerance of chlorine to the reverse osmosis membrane than the same membrane without the ionic complex.

15. The membrane as described in claim 1 wherein the membrane bearing the ionic complex has a magnesium sulfate rejection of at least about 85 percent using an aqueous feed with 2,000 ppm magnesium sulfate at a pressure of 50 psi.

16. The membrane as described in claim 1 wherein the membrane bearing the ionic complex has a sodium chloride rejection of at least about 95 percent using an aqueous feed with 35,000 ppm sodium chloride at a pressure of 800 psi.

17. A process for separating a first component from a second component of a mixture or solution comprising contacting the membrane as described in claim 1 with the mixture or solution under conditions which promote selective permeation of one component of the mixture or the solution through the membrane.

* * * * *

UNITED STATES PATENT AND TRADEMARK OFFICE
CERTIFICATE OF CORRECTION

PATENT NO. : 4,927,540

DATED : May 22, 1990

INVENTOR(S) : Ritchie A. Wessling, Sharon S. Whipple, Richard F. Fibiger

It is certified that error appears in the above-identified patent and that said Letters Patent is hereby corrected as shown below:

Column 1, line 64, insert the word "and" between the words --nitrogen-- and --a--;

Column 2, line 28, insert the word "preferred" between the words --some-- and --embodi--;

Column 4, line 54, the word "DesirablY" should correctly appear as --Desirably--;

Column 7, line 26, insert the word "is" before the word --generally--;

Column 9, line 40, insert the phrase "membrane impermeable to compounds having a molecular" between the words --water-permeable-- and --weight--;

UNITED STATES PATENT AND TRADEMARK OFFICE
CERTIFICATE OF CORRECTION

PATENT NO. : 4,927,540

DATED : May 22, 1990

INVENTOR(S) : Ritchie A. Wessling, Sharon S. Whipple, Richard F. Fibiger

It is certified that error appears in the above-identified patent and that said Letters Patent is hereby corrected as shown below:

Column 9, line 55, the word "nigh" should correctly appear as --high--;

Column 10, line 52, the word "after" should correctly appear as --water--;

Column 11, line 10, the word "3-1 trimethoxysilyl)" should correctly appear as --3-(trimethoxysilyl)--;

Column 13, line 23, insert the word "25" between the words --aqueous-- and --ppm--;

Column 15, line 43, the word "cetate," should correctly appear as --acetate,--.

Signed and Sealed this

Twenty-ninth Day of October, 1991

Attest:

HARRY F. MANBECK, JR.

*Attesting Officer*    *Commissioner of Patents and Trademarks*